United States Patent
Zhao et al.

(10) Patent No.: US 8,488,698 B1
(45) Date of Patent: *Jul. 16, 2013

(54) FRAME SYNCHRONIZATION METHOD AND APPARATUS

(75) Inventors: Qing Zhao, Santa Clara, CA (US);
Jungwon Lee, Cupertino, CA (US);
Leilei Song, Sunnyvale, CA (US);
Songping Wu, Sunnyvale, CA (US);
Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/194,093

(22) Filed: Jul. 29, 2011

Related U.S. Application Data

(63) Continuation of application No. 12/899,928, filed on Oct. 7, 2010, now Pat. No. 7,995,666, which is a continuation of application No. 11/851,115, filed on Sep. 6, 2007, now Pat. No. 7,813,436.

(60) Provisional application No. 60/824,832, filed on Sep. 7, 2006.

(51) Int. Cl.
*H04K 1/10* (2006.01)
*H04L 27/28* (2006.01)

(52) U.S. Cl.
USPC ........... 375/260; 375/316; 375/345; 375/354; 455/127.1; 455/232.1

(58) Field of Classification Search
USPC .............. 375/260, 316, 345, 354; 455/127.1, 455/232.1
See application file for complete search history.

(56) References Cited

U.S. PATENT DOCUMENTS

| | | |
|---|---|---|
| 6,836,515 B1 | 12/2004 | Kay et al. |
| 6,865,168 B1 | 3/2005 | Sekine |
| 6,879,630 B2 | 4/2005 | Kokuryo et al. |
| 6,993,084 B1 | 1/2006 | Eberlein et al. |
| 7,394,870 B2 | 7/2008 | Chien et al. |
| 2004/0196926 A1* | 10/2004 | Chien et al. ............ 375/316 |

* cited by examiner

*Primary Examiner* — Ted Wang

(57) ABSTRACT

In a method for synchronizing a receiver to a synchronous signal, in a signal having been processed based on an automatic gain control (AGC) with a varying gain, a symbol is detected. An estimated beginning of a subsequent frame is determined based on the detected symbol. A gain of the AGC is fixed for a period during which the estimated start of the subsequent frame is processed by the AGC. A transform of the signal is analyzed to determine if the estimated start of the subsequent frame corresponds to an actual start of the subsequent frame. If the estimated start of the subsequent frame does not corresponds to the actual start of the subsequent frame, the gain of the AGC is allowed to resume varying and, a further symbol in the signal is detected, the signal having been processed based on the varying gain of the AGC.

20 Claims, 10 Drawing Sheets

FRAME SYNCHRONIZATION METHOD AND APPARATUS

CROSS-REFERENCE TO RELATED APPLICATION

This present disclosure is a continuation of U.S. application Ser. No. 12/899,928, filed on Oct. 7, 2010, which is a continuation of U.S. application Ser. No. 11/851,115 (now U.S. Pat. No. 7,813,436), filed on Sep. 6, 2007, which claims priority under 35 U.S.C. §119(e) to U.S. Provisional Application No. 60/824,832, filed on Sep. 7, 2006.

FIELD OF TECHNOLOGY

The present disclosure relates generally to communication devices, and more particularly, to techniques for synchronizing to a communication signal.

DESCRIPTION OF THE RELATED ART

Orthogonal frequency-division multiplexing (OFDM) is a digital multi-carrier modulation scheme that employs a large number of relatively closely spaced orthogonal sub-carriers. Each sub-carrier is itself modulated with a modulation scheme such as quadrature amplitude modulation, phase shift keying, etc., at a relatively low symbol rate. Even though data on a particular sub-carrier is modulated at a low symbol rate, the large number of sub-carriers provides an overall data rate similar to single-carrier modulation schemes that utilize the same bandwidth. An advantage of OFDM over single-carrier modulation schemes is its ability to cope with severe channel conditions such as, multipath and narrowband interference. For instance, the relatively low symbol rate allows the use of a guard interval between symbols to help manage time-domain spreading of the signal due to multipath propagation.

In a synchronous OFDM system, data transmission may occur within time slots of a known length. For example, data transmissions may be organized into equal length slots. FIG. 1A is a diagram showing a plurality of frames in an example synchronous OFDM system. In the system of FIG. 1A, each frame is transmitted within a slot. Although the slots are of equal length T, the frames need not have the same length. But frames are transmitted at the beginning of a slot. As can be seen in FIG. 1A, the beginning of each frame begins at a time T after the beginning of the previous frame. For comparison, a diagram of an asynchronous OFDM system is shown in FIG. 1B. In the system of FIG. 1B, the length between the beginning of a frame and the beginning of the previous frame is not known a priori.

For a communication device to operate in a synchronous OFDM system, it must first determine when each frame begins. Generally, the device analyzes a received OFDM signal and attempts to determine the start of a frame. When this is accomplished, the device can determine when the next frame begins because the time period between the beginnings of adjacent frames is known. This process may be referred to as acquiring frame synchronization. For example, when a device is first powered-up, it may operate in an asynchronous mode until it acquires initial frame synchronization. Also, after acquiring frame synchronization, the device may lose synchronization due, for example, to movement of the device, deep fading, a fault operation of the device, etc. Thus, the device may need to reacquire frame synchronization.

FIG. 2 is a block diagram of an example OFDM receiver 100. The receiver 100 includes a radio frequency (RF) demodulator 104 that receives an OFDM signal that has been modulated on an RF carrier and demodulates the OFDM signal to baseband or an intermediate frequency (IF). The RF demodulator 104 is coupled to an automatic gain control (AGC) block 108, which is in turn coupled to an analog-to-digital converter (ADC) 112. The AGC block 108 includes a variable gain amplifier with a gain that is adjusted in an attempt to optimally fit the output of the RF demodulator 104 within a dynamic range of the ADC 112.

A timing correction block 116 is coupled to the ADC 112, and processes an output of the ADC 112 ($\hat{y}(n)$) to compensate for timing errors due to, for example, a carrier frequency offset and/or a sampling period offset. An output of the timing correction block 116 ($y(n)$) includes signal information corresponding to OFDM symbols and signal information corresponding to guard intervals, which may include a cyclic prefix, for example. A cyclic prefix is merely a copy of an ending portion of the OFDM symbol inserted in the guard interval that precedes the OFDM symbol.

A windowing block 118 is coupled to the timing correction block 116. The windowing block 118 provides a block of signal samples $x_0, x_1, \ldots x_{N-1}$ to a fast Fourier transform calculation block 120 (such as a Fourier transform (FFT) block) to which the windowing block 118 is coupled. The signal samples $x_0, x_1, \ldots x_{N-1}$ correspond to an OFDM symbol. In other words, the windowing block 118 attempts to extract OFDM symbols from the signal y(n). The FFT block 120 performs an FFT operation on the set of N signal samples $x_0, x_1, \ldots x_{N-1}$ and generates a set of N signals $X_0, X_1, \ldots X_{N-1}$ that correspond to the OFDM symbol. Each of the N signals $X_0, X_1, \ldots X_{N-1}$ may be a quadrature amplitude modulation (QAM), phase-shift keying (PSK), etc., modulated signal. A demodulator 124 is coupled to the FFT block 120 and demodulates each of the signals $X_0, X_1, \ldots X_{N-1}$ to generate an information signal s(i).

Acquiring frame synchronization in OFDM systems can be a challenging problem. First, although the OFDM signal may include data that indicates the beginning of a frame, the device first needs proper timing information to demodulate and obtain this data. Thus, frame synchronization must be done in the time domain, i.e., before the fast Fourier transform (FFT) operation. Also, there may only be limited information (or no information) available regarding a time-domain training signal. Further, a frame synchronization acquisition method should be robust to impairments such as carrier frequency offset, phase noise, impulse interference, etc. As is known to those of ordinary skill in the art, a carrier frequency offset at the receiver may cause the loss of orthogonality between the OFDM subcarriers, resulting in inter-carrier interference. It may be difficult to correct for carrier frequency offset prior to acquiring frame synchronization.

Typical frame synchronization procedures utilize redundant information in the cyclic prefix to detect an OFDM symbol by analyzing the signal prior to the FFT operation. For example, an autocorrelation may be performed on the signal prior to the FFT block 120, and peaks in the autocorrelation result will indicate the beginnings of OFDM symbols. Because gain adjustments due to automatic gain control (AGC) will change the amplitude of the cyclic prefix with respect to the corresponding OFDM symbol, symbol detection using autocorrelation is adversely affected by the operation of the AGC. Thus, the gain of the AGC is fixed so that the amplitude information is preserved for autocorrelation calculation.

When an autocorrelation peak is found, this indicates the beginning of an OFDM symbol. An FFT corresponding to the detected OFDM symbol is then calculated, and the result is analyzed to determine if the OFDM symbol corresponds to the beginning of a frame. For example, the output of the FFT block 120 may be analyzed to determine if it matches a pattern corresponding to a frame preamble. If the beginning of a frame is detected, frame synchronization is acquired. If not, the pre-FFT analysis may be repeated to find other OFDM symbols, and FFTs may be calculated and analyzed to determine if any of these other OFDM symbols is the beginning of a frame.

SUMMARY OF THE DISCLOSURE

In one embodiment, a method for synchronizing a receiver to a synchronous signal detecting a symbol in a signal, the signal having been processed based on an automatic gain control (AGC) with a varying gain, and determining, based on the detected symbol, an estimated beginning of a subsequent frame. The method also includes fixing a gain of the AGC for a period during which the estimated start of the subsequent frame is processed by the AGC. Additionally, the method includes calculating a transform of the signal corresponding to the estimated start of the subsequent frame, and analyzing the transform of the signal to determine if the estimated start of the subsequent frame corresponds to an actual start of the subsequent frame. If the estimated start of the subsequent frame does not corresponds to the actual start of the subsequent frame, (i) the gain of the AGC is allowed to resume varying and (ii) a further symbol in the signal is detected, the signal having been processed based on the varying gain of the AGC. If the estimated start of the subsequent frame corresponds to the actual start of the subsequent frame, the receiver is synchronized to the actual start of the frame.

In another embodiment, an apparatus for synchronizing a receiver to a synchronous orthogonal frequency-division multiplexing (OFDM) signal comprises an OFDM symbol detector to analyze a pre-Fourier transform OFDM signal, and a frame start detector to analyze a post-Fourier transform OFDM signal. The apparatus additionally comprises a controller coupled to the OFDM symbol detector, the frame start detector and an automatic gain control (AGC) block. The controller is configured to cause the AGC block to operate in a varying gain mode while the OFDM symbol detector analyzes the pre-Fourier transform signal to detect an OFDM symbol, and determine, based on the detected OFDM symbol, an estimated beginning of a subsequent frame. Additionally, the controller is configured to cause the AGC block to operate in a fixed gain mode for a period corresponding to the estimated beginning of the subsequent frame. Also, the controller is configured to cause a Fourier transform corresponding to the estimated beginning of the subsequent frame to be calculated, and cause the frame start detector to analyze the post-Fourier transform OFDM signal corresponding to the estimated beginning of the subsequent frame to determine if the estimated beginning of the subsequent frame is an actual beginning of the subsequent frame. The controller is further configured to cause the AGC block to operate in the varying gain mode while the detector analyzes the pre-Fourier transform signal to detect a further OFDM symbol if the estimated beginning of the subsequent frame is not the actual beginning of the subsequent frame, and synchronize the receiver to the start of the frame if the estimated beginning of the subsequent frame is the actual beginning of the subsequent frame.

In yet another embodiment, a method for synchronizing a receiver to a synchronous signal includes detecting an orthogonal frequency-division multiplexing (OFDM) symbol in a signal, the signal having been processed based on automatic gain control (AGC) with a varying gain, and determining, based on the detected OFDM symbol, an estimated beginning of a subsequent frame. The method additionally includes fixing a gain of the AGC for a period during which the estimated start of the subsequent frame is processed by the AGC. The method also includes calculating a Fourier transform of the signal corresponding to the estimated start of the subsequent frame, and analyzing the Fourier transform of the signal to determine if the estimated start of the subsequent frame corresponds to an actual start of the subsequent frame. If the estimated start of the subsequent frame does not corresponds to the actual start of the subsequent frame, the gain of the AGC is allowed to resume varying and a further OFDM symbol in the signal is detected, the signal having been processed based on the varying gain of the AGC. If the estimated start of the subsequent frame corresponds to the actual start of the subsequent frame, the receiver is synchronized to the actual start of the frame.

DETAILED DESCRIPTION

Figure 1A:
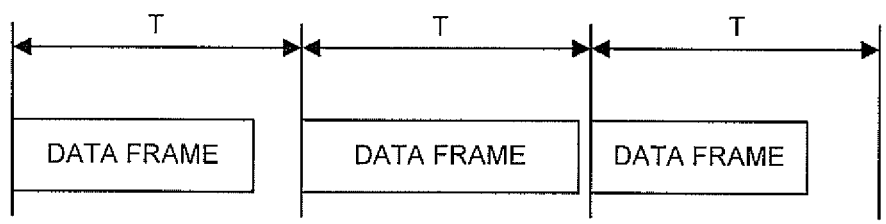
FIG. 1A is a diagram illustrating a plurality of frames in a synchronous orthogonal frequency-division multiplexing (OFDM) communication system.
Figure 1B:
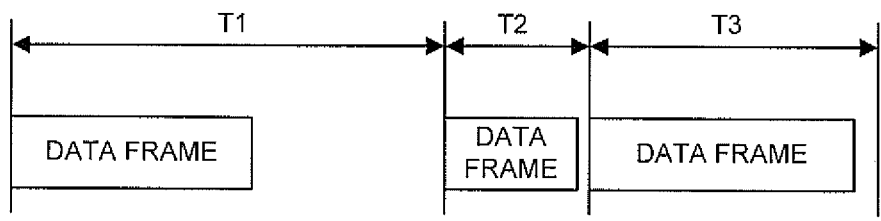
FIG. 1B is a diagram illustrating a plurality of frames in an asynchronous OFDM communication system.
Figure 2:
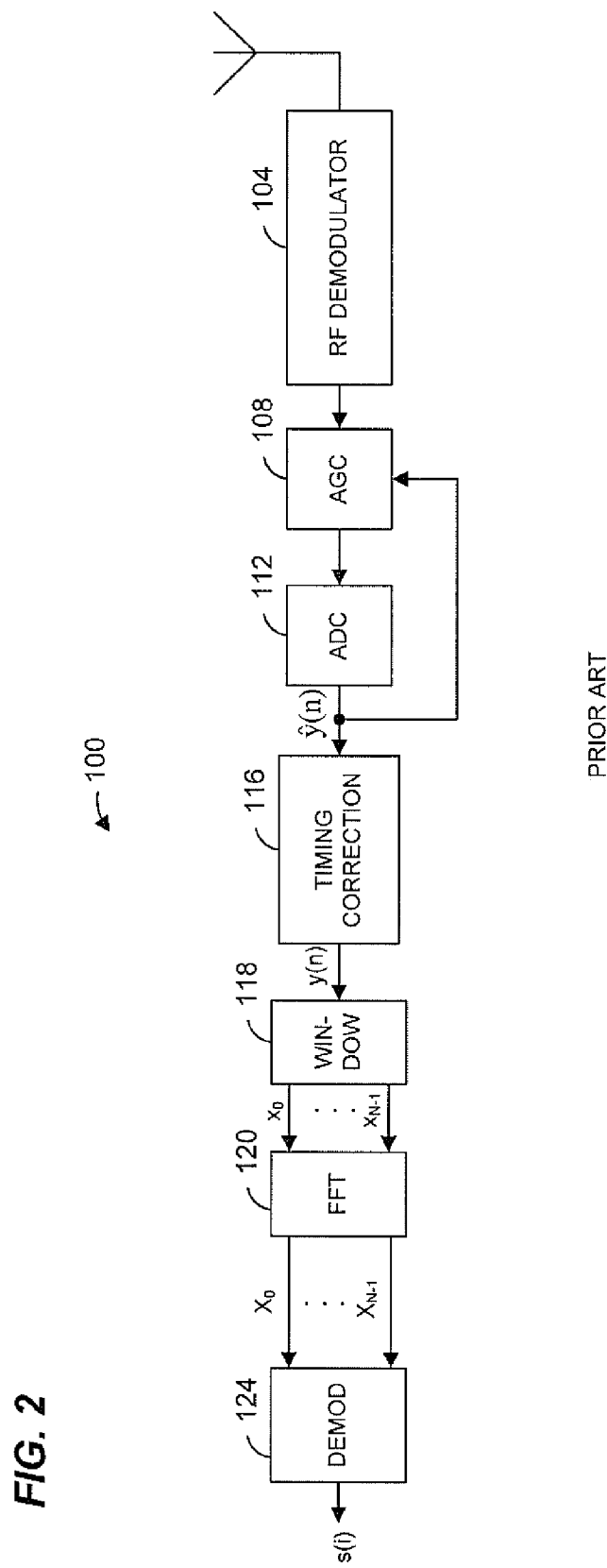
FIG. 2 is a block diagram of a prior art OFDM receiver.
Figure 3:
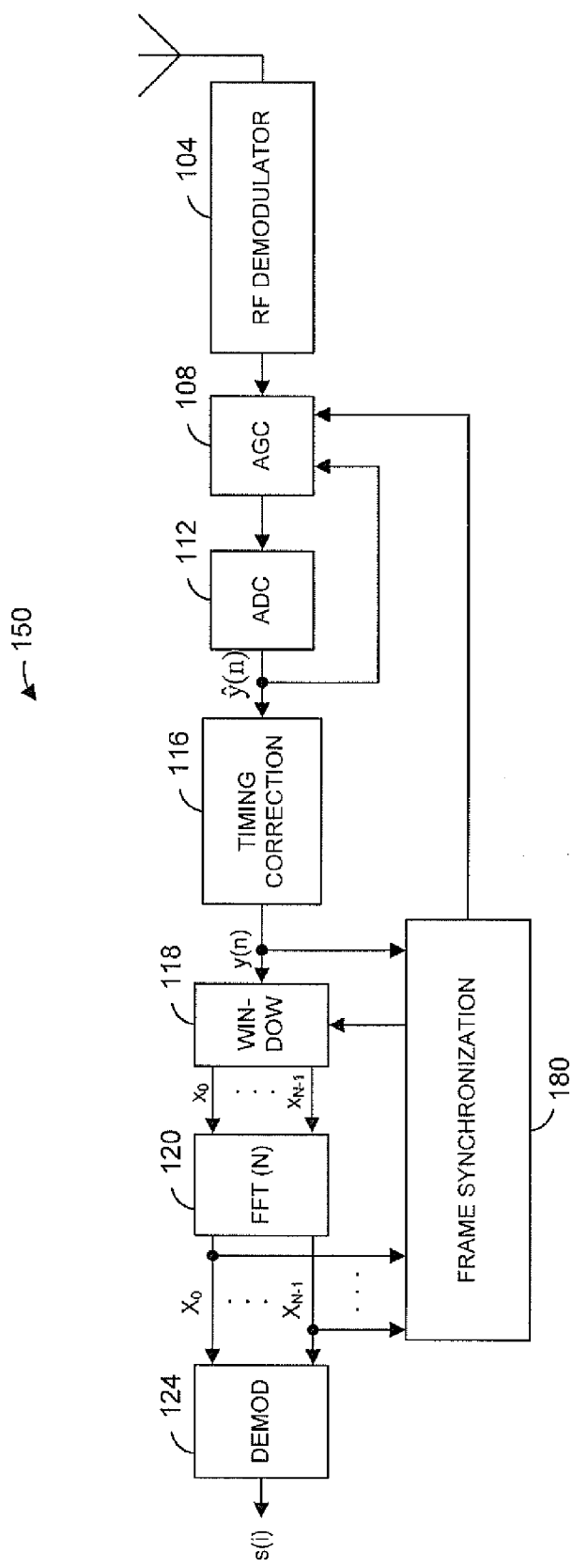
FIG. 3 is block diagram of an example OFDM receiver.

FIG. 3 is a block diagram of an example OFDM receiver 150. The receiver 150 includes like-numbered elements of the receiver 100 of FIG. 2. Additionally, the receiver 150 includes a frame synchronization processor 180. The frame synchronization processor 180 is coupled to the AGC block 108, the timing correction block 116 and the FFT block 120. As will be described in more detail below, the frame synchronization processor 180 may analyze the OFDM signal prior to the FFT block 120 (pre-Fourier transform) and after the FFT block 120 (post-Fourier transform) to detect OFDM symbols and the start of an OFDM frame. Additionally, the frame synchronization processor 180 may control the AGC 108 during acquisition. Generally speaking, the frame synchronization processor 180 attempts to detect a start of frame in two main phases. First, it analyzes the pre-Fourier transform OFDM signal while the AGC block 108 operates normally (e.g., the AGC gain is not fixed) to detect OFDM symbols. Second, for each OFDM symbol identified in the first phase, it analyzes the post-Fourier transform OFDM signal after a delay of a frame time period T to detect whether it corresponds to a start of a frame. During the second phase, the frame synchronization processor 180 causes the gain of the AGC block 108 to remain fixed for the duration of the potential OFDM symbol in the subsequent frame.

Figure 4:
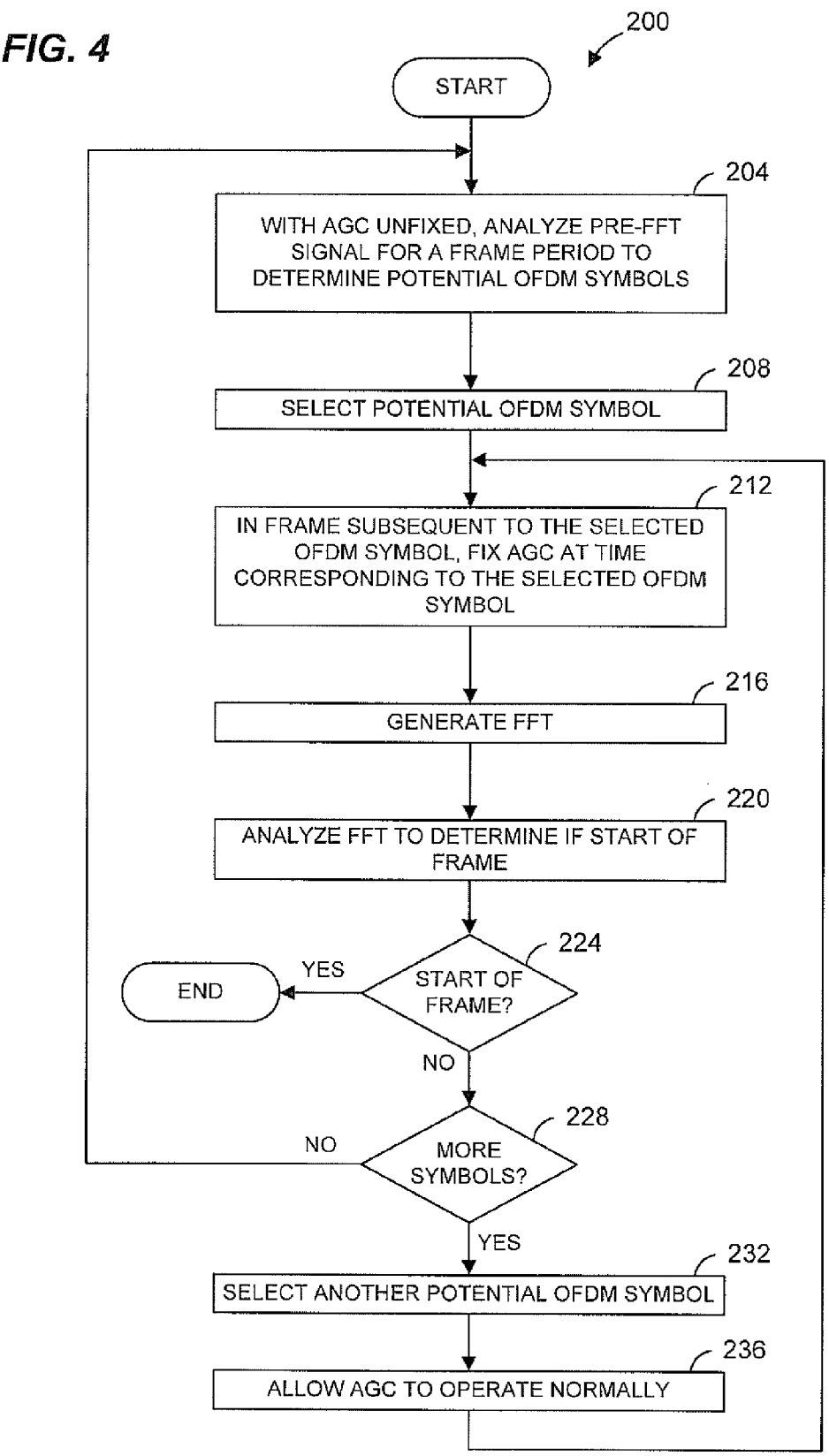
FIG. 4 is a flow diagram of an example method for synchronizing an OFDM receiver.

FIG. 4 is a flow diagram of an example method 200 for acquiring frame synchronization that may be implemented by the receiver 150 of FIG. 3. The method 200 will be described with reference to FIG. 3 for ease of explanation. Of course, one of ordinary skill in the art will recognize that the method 200 may be implemented in other systems as well. Similarly, one of ordinary skill in the art will recognize that the receiver 150 may implement a method different than the method 200.

At a block 204, an AGC block is allowed to operate normally (i.e., the AGC gain is not fixed) and an OFDM signal on which a Fourier transform operation (e.g., a discrete-time Fourier transform, a fast Fourier transform (FFT), etc.) has not yet been performed is analyzed for at least a frame period T to detect potential OFDM symbols. In the receiver 150, the frame synchronization processor 180 may control the AGC block 108 so that the AGC block 108 operates normally. Additionally, the frame synchronization processor 180 analyzes the pre-Fourier transform OFDM signal for a frame period T to detect potential OFDM symbols. In other words, the frame synchronization processor 180 analyzes the signal y(n) and/or the signal ŷ(n). Any of variety of techniques, including currently known techniques, may be utilized to detect potential OFDM symbols. Some example techniques will be described subsequently.

Figure 5:
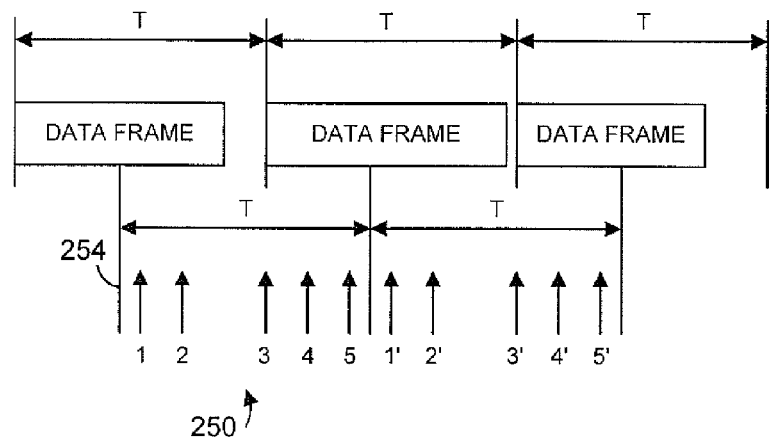
FIG. 5 is a diagram illustrating the processing of detected symbols during an example frame synchronization method.

Referring now to FIG. 5, it illustrates three frames of an OFDM signal. A first period 250 corresponds to processing of the block 204 of FIG. 4. In particular, the frame synchronization processor 180 may begin analyzing the pre-Fourier transform signal at a time 254 and may continue analyzing the signal for a time T, which is the time period of the OFDM frame. By analyzing the OFDM signal for the time T, it is assured that the beginning of a frame will be included in the analysis. The vertical lines labeled 1, 2, 3, 4 and 5 indicate times at which a potential OFDM symbol was detected by the frame synchronization processor 180.

Referring again to FIG. 4, at a block 208, one of the potential OFDM symbols detected at the block 204 is selected. The block 208 may be implemented by the frame synchronization processor 180, for example. Then, at a block 212, the AGC block is fixed during a time period in a subsequent frame corresponding to a potential OFDM symbol that should occur at time aT after the selected potential OFDM symbol, where a is some positive integer. As will be described further below, the integer a typically will be the value one or two, but other positive integer values could be utilized. The frame synchronization processor 180 may control the AGC block 108 to fix its gain during a time period in a subsequent frame that starts approximately at a time T after the beginning of the selected OFDM symbol and that lasts approximately the length of an OFDM symbol. Referring again to FIG. 5, the potential OFDM symbol 1 could be the first symbol selected. In the subsequent frame, an OFDM symbol 1' should start at a time T after the start of the OFDM symbol 1. Thus, the AGC block could be fixed during a time period that corresponds to the potential OFDM symbol 1'.

Referring again to FIG. 4, at a block 216, a Fourier transform is generated for the OFDM signal during the time period corresponding to the potential OFDM symbol at the time aT after the selected potential OFDM symbol. The windowing block 118 may provide signal samples $x_0, x_1, x_{N-1}$ to the FFT block 120 under the control of the frame synchronization processor 180 and the FFT block 120 may generate the signals $X_0, X_1, \ldots X_{N-1}$. For instance, the synchronization processor 180 may indicate to the windowing block 118 when to provide data to the FFT block 120 and/or which data to provide to the FFT block 120.

At a block 220, the result of the Fourier transform may be analyzed to determine if it corresponds to the start of a frame. Any of a variety of techniques, including known techniques, may be utilized to determine whether the Fourier transform is the start of the frame. As just one example, a pattern-matching technique may be utilized to determine if the result of the Fourier transform matches a frame start pattern, such as a frame preamble. At a block 224, if it was determined at the block 220 that the frame start was detected, the flow may end. For example, the frame synchronization processor 180 may determine that frame synchronization is acquired or it may cause further processes to initiate in order to confirm that the frame start was detected. On the other hand, if it was determined at the block 220 that the frame start was not detected, the flow may proceed to a block 228.

At the block 228, it may be determined if there are other potential OFDM symbols that were determined at the block 204 but have not yet been selected. If there are more unselected potential OFDM symbols, the flow may proceed to a block 232 at which a different potential OFDM symbol may be selected. For example, potential OFDM symbols may be selected in an order based on the time at which they begin. At a block 236, the AGC block may be allowed to operate normally (e.g., the gain of the AGC block may be allowed to vary). For example, the frame synchronization processor 180 may control the AGC block 108 so that the AGC block 108 operates normally.

Then, the flow may proceed back to the block 212. Referring again to FIG. 5, one or more of the potential OFDM symbols 2', 3', 4' and 5' may thus be analyzed to determine if they correspond to the start of a frame. At the block 228, if there are no more unselected potential symbols, the flow may proceed back to the block 204.

One of ordinary skill in the art will recognize many variations to the example method of FIG. 4. As just one example, an additional block may be added between the blocks 204 and 208 at which some potential OFDM symbol candidates may be eliminated. For example, some potential OFDM symbol candidates may be eliminated based on the frame structure utilized in particular implementations, as will be described in more detail below.

Figure 6:
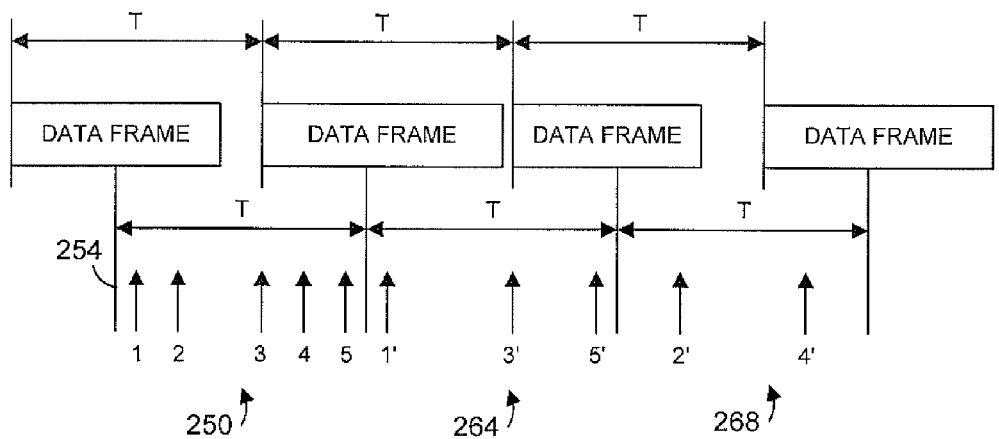
FIG. 6 is a diagram illustrating the processing of detected symbols during another example frame synchronization method.

As another example, if potential OFDM symbols are spaced too closely in time to allow the AGC block to be reset between potential OFDM symbols, the potential symbols may be organized into two or more groups, where potential symbols in each group are spaced such that the AGC block to be reset between the candidates. Referring now to FIG. 6, it illustrates the same three frames of an OFDM signal as in FIG. 5. In the illustration of FIG. 6, however the potential OFDM symbols in subsequent frames 1', 2', 3', 4' and 5' corresponding to the potential OFDM symbols 1, 2, 3, 4 and 5 are organized into two groups 264 and 268. The group 264 includes the potential OFDM symbols 1', 3' and 5', which each approximately begin at a time period T after the beginning of the respective potential OFDM symbols 1, 3 and 5. The group 268 includes the potential OFDM symbols 2' and 4', which each approximately begin at a time period 2T after the beginnings of the respective potential OFDM symbols 2 and 4. In other words, the potential OFDM symbols 1', 3' and 5' may first be evaluated, and then the potential OFDM symbols 2' and 4' may be evaluated.

Figure 7:
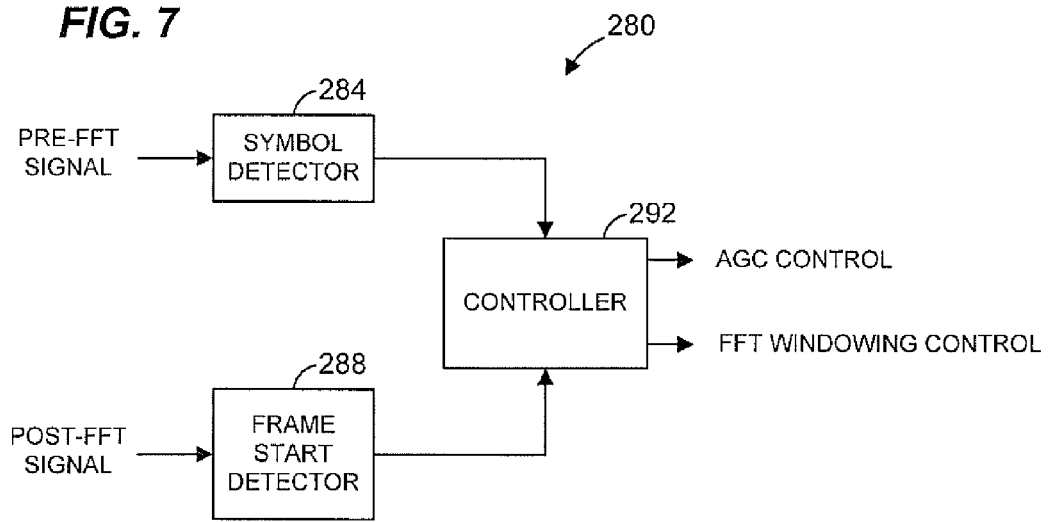
FIG. 7 is a block diagram of an example frame synchronization processor that may be utilized in the receiver of FIG. 3.

FIG. 7 is a block diagram of an example frame synchronization processor 280. The frame synchronization processor 280 may be used with the receiver 150 of FIG. 3. Of course, one of ordinary skill in the art will recognize that the frame synchronization processor 280 of FIG. 3 may be utilized in other systems as well. Similarly, one of ordinary skill in the art will recognize that the receiver 150 may utilize a frame synchronization processor other than the frame synchronization processor 280 of FIG. 3. The frame synchronization processor 280 may be used to implement the method 200 of FIG. 4. Of course, one of ordinary skill in the art will recognize that the method 200 may be implemented with a frame synchronization processor other than the frame synchronization processor 280 of FIG. 3.

The frame synchronization processor 280 comprises a symbol detector 284 that is coupled to a pre-Fourier transform signal such as the output of the AGC block 108, the output of the ADC 112, and/or the output of the timing correction block 116. The symbol detector 284 analyzes the pre-Fourier transform signal to detect OFDM symbols, and will be discussed in more detail subsequently. The frame synchronization processor 280 also comprises a frame start detector 288 that is coupled to a post-Fourier transform signal, such as the output of the FFT block 120 or the output of the demodulator 124. The frame start detector 284 analyzes the post-Fourier transform signal to detect the start of a frame. The frame start detector 284 may include a pattern-matching block, for example, to detect a frame start pattern, such as a frame preamble.

The frame synchronization processor 280 also comprises a controller 292 coupled to the symbol detector 284, the frame start detector 288, an AGC block and an FFT windowing block. The controller 292 generates an AGC control signal that causes the AGC block to operate in a varying gain mode while the symbol detector 284 is detecting potential OFDM symbols (block 204 of FIG. 4). Also, the controller 292 generates the AGC control signal to cause the AGC block to operate in a fixed gain mode at times corresponding to next frame potential symbols (block 212 of FIG. 4). Further, the controller 292 generates the AGC control signal to cause the AGC block to reset and operate in the varying gain mode when the frame start detector 288 fails to detect the start of a frame (block 236 of FIG. 4).

The controller 292 also may generate an FFT windowing control signal that may be coupled to the FFT windowing block 118 of FIG. 3. The FFT windowing control signal may indicate to the FFT windowing block 118 when an FFT should be calculated and/or the signal samples corresponding to a next frame potential symbol. For example, the controller 292 may determine the beginning of a next frame potential OFDM symbol based on the beginning of the corresponding potential OFDM symbol detected by the symbol detector 284.

Also, the controller 292 may eliminate potential symbols, group potential symbols, and prioritize potential symbols discussed above.

As discussed above with respect to the block 204 of FIG. 4, various techniques may be utilized to detect potential OFDM symbols. For example, a maximum-likelihood approach may be utilized if there is some knowledge of the signal-to-noise ratio (SNR). If knowledge of the SNR is not available, other techniques may be utilized. Many such detection techniques involve calculating an autocorrelation function to detect the redundancy between the cyclic prefix and the corresponding OFDM symbol. Because the gain of the AGC block may vary as the cyclic prefix and the OFDM symbol are received, however, the likeness in amplitude between the cyclic prefix and the OFDM symbol may be destroyed, at least partially. The likeness in phase will remain preserved. Thus, some implementations may utilize an autocorrelation operation on only the phase information. Other implementations may utilize an autocorrelation operation on partial amplitude information as well the phase information. Of course, some implementations may also utilize and autocorrelation operation on the full amplitude information and the phase information even though the likeness in amplitude between the cyclic prefix and the OFDM symbol may be destroyed, at least partially.

In systems that utilize the full amplitude and phase information, an autocorrelation may be generated according to the equation:

$$C(n) = \frac{\left| \sum_{l=0}^{M-1} y(n+l)y*(n+l+N) \right|}{\sum_{l=0}^{M-1} |y(n+l+N)|^2} \qquad \text{Equ. 1}$$

where N is the length of an OFDM symbol and M is the length of the cylic prefix. In systems that utilize only phase information, an autocorrelation may be generated according to the equation:

$$C(n) = \left| \sum_{l=0}^{M-1} r(n+l)r*(n+l+N) \right| \qquad \text{Equ. 2}$$

where:

$$r(n) = \frac{y(n)}{|y(n)|}. \qquad \text{Equ. 3}$$

Equation 3 could be implemented by a normalizer, for example.

In at least some symbol detection methods that may be utilized, a fractional part of carrier frequency offset may be estimated. Thus, in the example receiver 150 of FIG. 3, the frame synchronization processor 180 may provide this information to the timing correction block 116 so that post-Fourier transform processing may take into account the detected fractional part of the carrier frequency offset.

Figure 8:
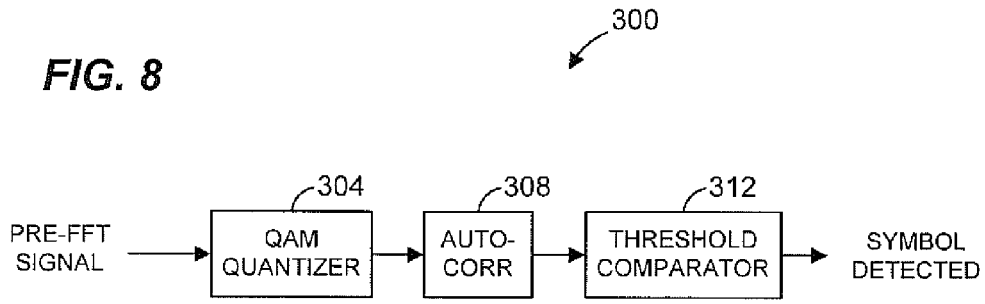
FIG. 8 is a block diagram of an example symbol detector that may be utilized in the frame synchronization processor of FIG. 7.

FIG. 8 is a block diagram of an example OFDM symbol detection system 300 that analyzes both amplitude information and phase information. The OFDM symbol detection system 300 may be implemented as part of the frame synchronization processor 180, for example. Of course, the OFDM symbol detection system 300 may be utilized in receivers other than the receiver 150 of FIG. 3. Similarly, the receiver 150 may utilize an OFDM symbol detection system other than the OFDM symbol detection system 300. Also, the symbol detector 284 of FIG. 7 may comprise the OFDM symbol detection system 300. Of course, the symbol detector 284 may comprise other types of symbol detectors as well.

Figure 9:
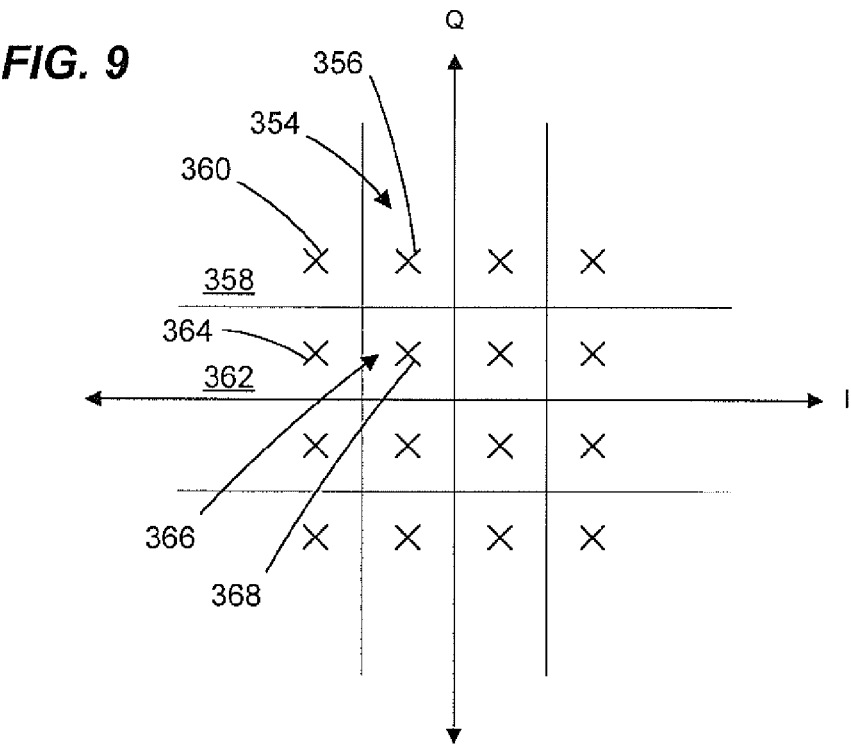
FIG. 9 is constellation diagram illustrating the operation of the QAM quantizer of FIG. 8.

The OFDM symbol detection system 300 includes a QAM quantizer 304 that receives I and Q components of a pre-Fourier transform OFDM signal (e.g., the signal y(n)) and quantizes the signal to some number of QAM constellation points. Operation of the QAM quantizer 304 will be described with reference to FIG. 9, which is a 16-QAM constellation diagram. Of course, numbers other than 16 constellation points can be utilized. In the example of FIG. 9, if the received signal falls within the region 354, the QAM quantizer 304 quantizes the received signal to the constellation point 356. Similarly, if the received signal falls within the region 358, the QAM quantizer 304 quantizes the received signal to the constellation point 360. Also, if the received signal falls within the region 362, the QAM quantizer 304 quantizes the received signal to the constellation point 364, and if the received signal falls within the region 366, the QAM quantizer 304 quantizes the received signal to the constellation point 368. In this way, only 2 $\log_2 M$ bits are needed to represent both the I and Q components of the pre-Fourier transform signal. If the QAM quantizer 304 is a 4-QAM quantizer, it could generate its output according to the equation:

$$z(n) = \text{sign}(y_I(n)) + j\text{sign}(y_Q(n)) \qquad \text{Equ. 4}$$

where $y_I(n)$ is the I component of the signal y(n) and $y_Q(n)$ is the Q component of the signal y(n).

Referring again to FIG. 8, the output of the QAM quantizer 304 is coupled to an autocorrelation block 308 which generates an autocorrelation of the output of the QAM quantizer 304. For example, the output of the QAM quantizer may be calculated as:

$$C(n) = \left| \sum_{l=0}^{M-1} z(n+l) z*(n+l+N) \right| \qquad \text{Equ. 5}$$

where z(n) is the output of the QAM quantizer 304.

The output of the autocorrelation block 308 may be coupled to a threshold comparator 312 that may compare the output of the autocorrelation block 308 to a threshold, for example. In such an implementation, the threshold comparator 312 may generate an indication that a symbol is detected if the output of the autocorrelation block 308 exceeds the threshold, for example. The threshold may be chosen based on, for example, an acceptable false alarm rate and an acceptable miss rate. Of course, detection of OFDM symbols may be based on other types of processing of the output of the QAM quantizer 304 and/or the output of the autocorrelation block 308 additionally or alternatively.

Other types of symbol detection systems may be utilized as well. For example, if an autocorrelation according to Equation 1 is to be utilized, the QAM quantizer 304 may be omitted. As another example, if an autocorrelation according to Equations 2 and 3 is to be utilized, the QAM quantizer 304 may be replaced with a normalizer. One of ordinary skill in the art will recognize many other variations.

Figure 10:
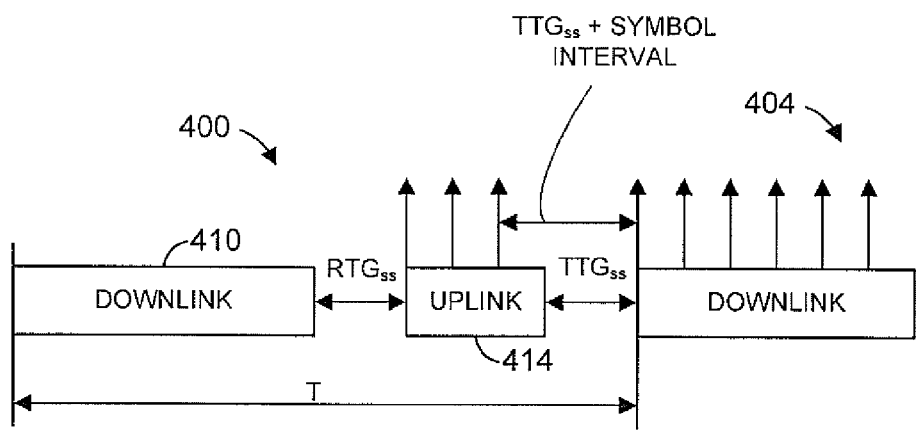
FIG. 10 is a diagram illustrating the processing of detected symbols in a system that utilizes downlink and uplink subframes.

As discussed above with respect to FIG. 4, during pre-Fourier transform processing, some potential OFDM symbol candidates may be eliminated. An example technique for eliminating potential OFDM symbol candidates will be described in the context of a WiMAX communication system (i.e., IEEE 802.16). FIG. 10 is an illustration of the frame structure of a WiMAX communication system, and includes a frame 400 and a portion of a subsequent frame 404. Each frame has a period T and may include a downlink subframe and an uplink subframe. For example, the frame 400 includes a downlink subframe 410 and an uplink subframe 414. The first symbol of each downlink subframe includes a preamble symbol that identifies it at the beginning of a downlink subframe. Post-Fourier transform frame synchronization processing such as described previously may include attempting to detect this preamble symbol.

For each frame, there is a minimum turnaround gap of length $RTG_{ss}$ between the end of the downlink subframe and the beginning of the uplink subframe. Similarly, there is a minimum turnaround gap of length $TTG_{ss}$ between the end of the uplink subframe and the end of the frame (or the beginning of the downlink subframe of the next frame). Minimum turnaround gap lengths may be utilized in identifying potential OFDM frame start symbols and/or eliminating detected OFDM symbols as potential OFDM frame start symbols. For example, there is a gap of at least the minimum turn around time $TTG_{ss}$ and an OFDM symbol interval (i.e., the OFDM symbol length plus the guard interval length) between the beginning of the last OFDM symbol of an uplink subframe and the beginning of the first symbol (the preamble symbol) of the next downlink subframe. This fact can be used to eliminate detected potential OFDM symbols from later post-Fourier transform processing. For instance, if the beginning of a potential symbol is not spaced at least $TTG_{ss}$ plus the length of an OFDM symbol interval from the beginning of a previous potential symbol, it may be assumed that the potential symbol cannot be the start of a frame. In that case, post-Fourier transform frame synchronization processing corresponding to that symbol could be omitted.

Also, it could be used in grouping potential OFDM symbols for post-Fourier transform processing. As discussed above, potential OFDM symbol candidates need to spaced a minimum distance in order to allow the AGC block to be reset between the candidates during post-Fourier transform frame synchronization processing. This minimum distance could be set to or determined based on the sum of the minimum turn around time $TTG_{ss}$ and an OFDM symbol interval. Additionally, it could be used for prioritizing potential OFDM symbol candidates for post-Fourier transform processing. For example, if the candidates need to broken into separate groups for post-Fourier transform processing as discussed above, them more likely candidates could be placed in the first group to be analyzed. For example, potential OFDM symbols that begin at least the minimum turn around time $TTG_{ss}$ plus the OFDM symbol interval after the beginning of the previous potential OFDM symbol may be chosen for the first group, if possible, over potential OFDM symbols that do not satisfy these criteria.

Although examples in the context of WiMAX (i.e., 802.16a/d/e) were discussed above, these frame synchronization techniques may be utilized in other contexts as well such as digital audio broadcast (DAB) systems and digital video broadcast (DVB) systems. More generally, techniques such as described above can be utilized in any OFDM synchronous communication system.

Figure 11A:
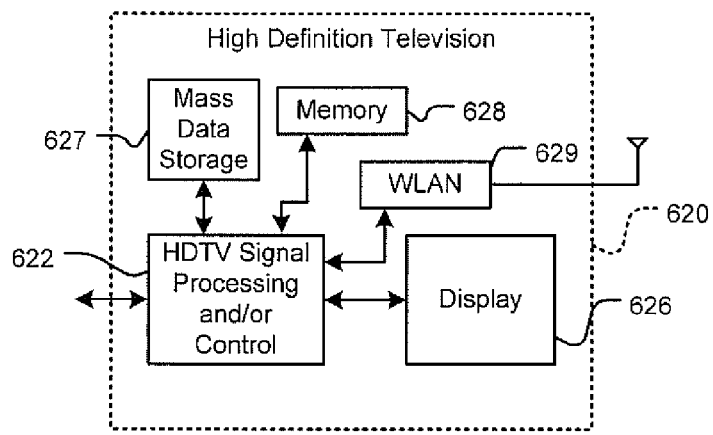
FIG. 11A is a block diagram of a high definition television that may utilize frame synchronization techniques such as described herein.

Referring now to FIGS. 11A-11F, various example devices that may utilize frame synchronization techniques such as described above will be described. Referring to FIG. 11A, such techniques may be utilized in a high definition television (HDTV) 620. The HDTV 620 includes signal processing and/or control circuits, which are generally identified in FIG. 11A at 622, a WLAN interface 629, and a mass data storage 627. Frame synchronization techniques may be utilized in the WLAN interface 629 or the signal processing circuit and/or control circuit 622, for example. HDTV 620 receives HDTV input signals in either a wired or wireless format and generates HDTV output signals for a display 626. In some implementations, signal processing circuit and/or control circuit 622 and/or other circuits (not shown) of HDTV 620 may process data, perform coding and/or encryption, perform calculations, format data and/or perform any other type of HDTV processing that may be required.

HDTV 620 may communicate with mass data storage 627 that stores data in a nonvolatile manner such as optical and/or magnetic storage devices. The mass data storage 627 may include one or more hard disk drives (HDDs) and/or one or more digital versatile disks (DVDs). One or more of the HDDs may be a mini HDD that includes one or more platters having a diameter that is smaller than approximately 1.8". HDTV 620 may be connected to memory 628 such as RAM, ROM, low latency nonvolatile memory such as flash memory and/or other suitable electronic data storage. HDTV 620 also may support connections with a WLAN via the WLAN network interface 629.

Figure 11B:
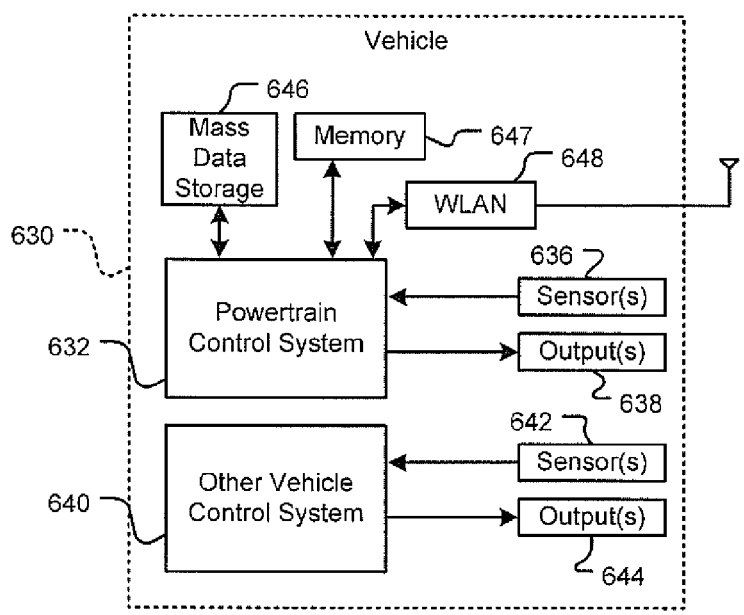
FIG. 11B is a block diagram of a vehicle that may utilize frame synchronization techniques such as described herein.

Referring now to FIG. 11B, techniques such as described above may be utilized in a control system of a vehicle 630. In some implementations, a powertrain control system 632 receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

A control system 640 may likewise receive signals from input sensors 642 and/or output control signals to one or more output devices 644. In some implementations, control system 640 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 632 may communicate with mass data storage 646 that stores data in a nonvolatile manner. Mass data storage 646 may include optical and/or magnetic storage devices for example hard disk drives HDD and/or DVDs. One or more of the HDDs may be a mini HDD that includes one or more platters having a diameter that is smaller than approximately 1.8". Powertrain control system 632 may be connected to memory 647 such as RAM, ROM, low latency nonvolatile memory such as flash memory and/or other suitable electronic data storage. Powertrain control system 632 also may support connections with a WLAN via a WLAN network interface 648. Frame synchronization techniques such as described above may be implemented in the WLAN interface 648. The control system 640 may also include mass data storage, memory and/or a WLAN interface (all not shown).

Figure 11C:
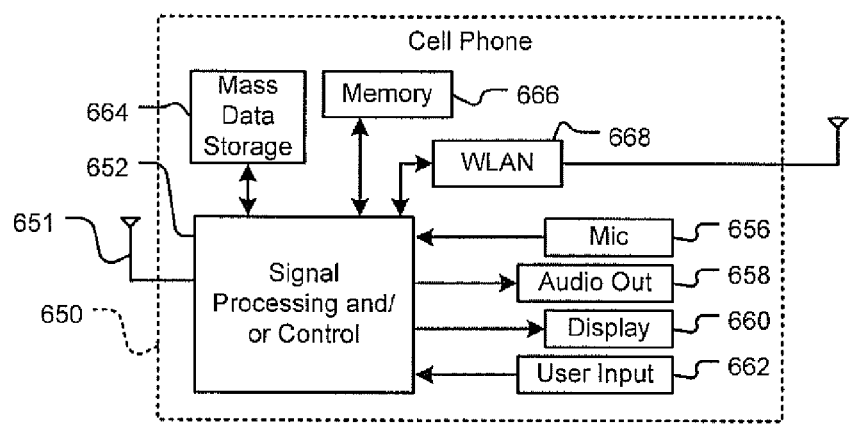
FIG. 11C is a block diagram of a cellular phone that may utilize frame synchronization techniques such as described herein.

Referring now to FIG. 11C, techniques such as described above may also be utilized in a cellular phone 650 that may include a cellular antenna 651. The cellular phone 650 includes signal processing and/or control circuits, which are generally identified in FIG. 11C at 652, a WLAN interface 668, and a mass data storage 664. Frame synchronization techniques may be implemented in the signal processing and/or control circuits 652 and/or the WLAN interface 668, for example. In some implementations, cellular phone 650 includes a microphone 656, an audio output 658 such as a speaker and/or audio output jack, a display 660 and/or an input device 662 such as a keypad, pointing device, voice actuation and/or other input device. Signal processing and/or control circuits 652 and/or other circuits (not shown) in cellular phone 650 may process data, perform coding and/or encryption, perform calculations, format data and/or perform other cellular phone functions.

Cellular phone 650 may communicate with mass data storage 664 that stores data in a nonvolatile manner such as optical and/or magnetic storage devices for example hard disk drives HDD and/or DVDs. At least one HDD may be a mini HDD that includes one or more platters having a diameter that is smaller than approximately 1.8". Cellular phone 650 may be connected to memory 666 such as RAM, ROM, low latency nonvolatile memory such as flash memory and/or other suitable electronic data storage. Cellular phone 650 also may support connections with a WLAN via a WLAN network interface 668.

Figure 11D:
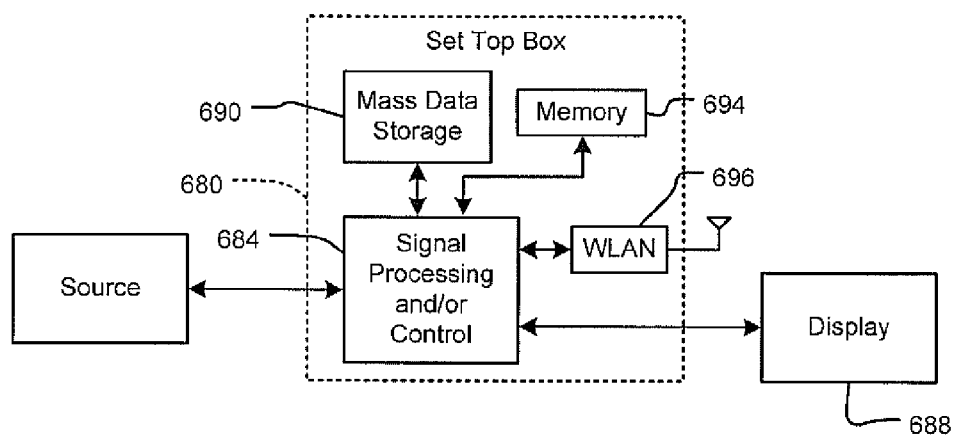
FIG. 11D is a block diagram of a set top box that may utilize frame synchronization techniques such as described herein.

Referring now to FIG. 11D, techniques such as described above may be utilized in a set top box 680. The set top box 680 includes signal processing and/or control circuits, which are generally identified in FIG. 11D at 684, a WLAN interface 696, and a mass data storage device 690. Frame synchronization techniques may be implemented in the signal processing and/or control circuits 684 and/or the WLAN interface 696, for example. Set top box 680 receives signals from a source such as a broadband source and outputs standard and/or high definition audio/video signals suitable for a display 688 such as a television and/or monitor and/or other video and/or audio output devices. Signal processing and/or control circuits 684 and/or other circuits (not shown) of the set top box 680 may process data, perform coding and/or encryption, perform calculations, format data and/or perform any other set top box function.

Set top box 680 may communicate with mass data storage 690 that stores data in a nonvolatile manner. Mass data storage 690 may include optical and/or magnetic storage devices for example hard disk drives HDD and/or DVDs. At least one HDD may be a mini HDD that includes one or more platters having a diameter that is smaller than approximately 1.8". Set top box 680 may be connected to memory 694 such as RAM, ROM, low latency nonvolatile memory such as flash memory and/or other suitable electronic data storage. Set top box 680 also may support connections with a WLAN via the WLAN network interface 696.

Figure 11E:
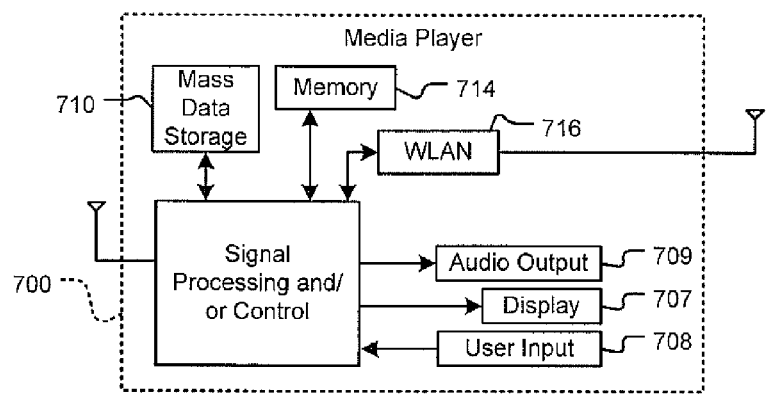
FIG. 11E is a block diagram of a media player that may utilize frame synchronization techniques such as described herein.

Referring now to FIG. 11E, techniques such as described above may be utilized in a media player 700. The media player 700 may include signal processing and/or control circuits, which are generally identified in FIG. 11E at 704, a WLAN interface 716, and a mass data storage device 710. Frame synchronization techniques may be implemented in the signal processing and/or control circuits 704 and/or the WLAN interface 716, for example. In some implementations, media player 700 includes a display 707 and/or a user input 708 such as a keypad, touchpad and the like. In some implementations, media player 700 may employ a graphical user interface (GUI) that typically employs menus, drop down menus, icons and/or a point-and-click interface via display 707 and/or user input 708. Media player 700 further includes an audio output 709 such as a speaker and/or audio output jack. Signal processing and/or control circuits 704 and/or other circuits (not shown) of media player 700 may process data, perform coding and/or encryption, perform calculations, format data and/or perform any other media player function.

Media player 700 may communicate with mass data storage 710 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may be a mini HDD that includes one or more platters having a diameter that is smaller than approximately 1.8". Media player 700 may be connected to memory 714 such as RAM, ROM, low latency nonvolatile memory such as flash memory and/or other suitable electronic data storage. Media player 700 also may support connections with a WLAN via a WLAN network interface 716. Still other implementations in addition to those described above are contemplated.

Figure 11F:
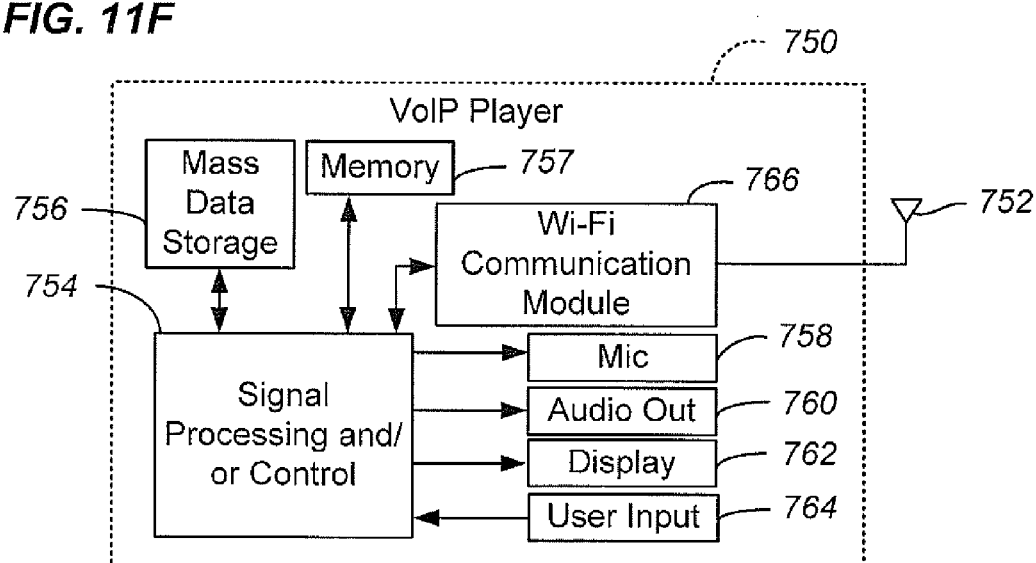
FIG. 11F is a block diagram of a voice over IP device that may utilize frame synchronization techniques such as described herein.

Referring to FIG. 11F, techniques such as described above may be utilized in a Voice over Internet Protocol (VoIP) phone 750 that may include an antenna 754, signal processing and/or control circuits 758, a wireless interface 762, and a mass data storage 766. Frame synchronization techniques described above may be implemented in the signal processing and/or control circuits 758 and/or the wireless interface 762, for example. In some implementations, VoIP phone 750 includes, in part, a microphone 770, an audio output 774 such as a speaker and/or audio output jack, a display monitor 778, an input device 782 such as a keypad, pointing device, voice actuation and/or other input devices, and a Wireless Fidelity (Wi-Fi) communication module 762. Signal processing and/or control circuits 758 and/or other circuits (not shown) in VoIP phone 750 may process data, perform coding and/or encryption, perform calculations, format data and/or perform other VoIP phone functions.

VoIP phone 750 may communicate with mass data storage 766 that stores data in a nonvolatile manner such as optical and/or magnetic storage devices, for example hard disk drives HDD and/or DVDs. The HDD may be a mini HDD that includes one or more platters having a diameter that is smaller than approximately 1.8". VoIP phone 750 may be connected to memory 786, which may be a RAM, ROM, low latency nonvolatile memory such as flash memory and/or other suitable electronic data storage. VoIP phone 750 is configured to establish communications link with a VoIP network (not shown) via Wi-Fi communication module 762.

The various blocks, operations, and techniques described above may be implemented in hardware, firmware, software, or any combination of hardware, firmware, and/or software. When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A method for synchronizing a receiver device, the method comprising:
   detecting, with the receiver device, a symbol in a signal;
   determining, with the receiver device and based on the detected symbol, an estimated beginning of a subsequent frame at a first time corresponding to at least one frame length after the detected symbol;
   determining, with the receiver device, whether the estimated start of the subsequent frame corresponds to an actual start of the subsequent frame;
   when the estimated start of the subsequent frame corresponds to the actual start of the subsequent frame, synchronizing the receiver to the actual start of the frame;
   when the estimated start of the subsequent frame does not corresponds to the actual start of the subsequent frame,
      detecting, with the receiver device, a further symbol in the signal,
      determining, with the receiver device and based on the further detected symbol, an estimated beginning of another subsequent frame at a second time corresponding to at least one frame length after the further detected symbol, and
      determining, with the receiver device, whether the estimated start of the other subsequent frame corresponds to an actual start of the other subsequent frame.

2. A method according to claim 1, wherein the method further comprises:
   detecting, with the receiver device, a plurality of symbols in the signal, wherein the plurality of symbols includes the detected symbol; and
   selecting, with the receiver device, the detected symbol from the plurality of symbols.

3. A method according to claim 2, further comprising eliminating, with the receiver device, one or more symbols from the plurality of symbols.

4. A method according to claim 3, wherein the frame comprises a downlink subframe and an uplink subframe;
   wherein eliminating one or more symbols comprises eliminating a symbol if a length between the beginning of the symbol and a beginning of a previous symbol is not at least the sum of (i) a symbol interval and (ii) a minimum turnaround time between an end of the uplink subframe and a beginning of the downlink subframe.

5. A method according to claim 2, further comprising grouping the plurality of symbols into at least a first group and a second group;
   wherein determining the estimated beginning of the subsequent frame comprises:
      determining the estimated beginning of the subsequent frame to be approximately one frame period after the beginning of the detected symbol if the detected symbol is from the first group, and
      determining the estimated beginning of the subsequent frame to be approximately two frame periods after the beginning of the detected symbol if the detected symbol is from the second group.

6. A method according to claim 1, wherein detecting the symbol comprises:
quantizing the signal to a quadrature amplitude modulation constellation; and
generating an autocorrelation based on the quantized signal.

7. A method according to claim 1, wherein detecting the symbol comprises:
normalizing the signal; and
generating an autocorrelation based on the normalized signal.

8. A method according to claim 1, wherein the signal is an orthogonal frequency-division multiplexing (OFDM) signal.

9. A method according to claim 1, wherein:
detecting the symbol comprises detecting the symbol after processing the signal based on an automatic gain control (AGC) device with a varying gain, and
the method further comprises fixing a gain of the AGC device for a period during which the estimated start of the subsequent frame is processed by the AGC device.

10. A method according to claim 1, further comprising calculating, with the receiver device, a transform of the signal corresponding to the estimated start of the subsequent frame; and
wherein determining whether the estimated start of the subsequent frame corresponds to the actual start of the subsequent frame comprises analyzing the transform of the signal.

11. An apparatus for synchronizing a receiver to a signal, the apparatus comprising:
a symbol detector configured to detect symbols in the signal;
a frame start detector configured to detect frames in the signal; and
a controller coupled to the symbol detector and the frame start detector, the controller configured to
determine, based on an indication of a detected symbol from the symbol detector, an estimated beginning of a subsequent frame at a first time corresponding to at least one frame length after the detected symbol,
cause the frame start detector to analyze the signal corresponding to the estimated beginning of the subsequent frame to determine if the estimated beginning of the subsequent frame is an actual beginning of the subsequent frame, and
synchronize the receiver to the start of the frame when the estimated beginning of the subsequent frame is the actual beginning of the subsequent frame,
when the estimated beginning of the subsequent frame is not the actual beginning of the subsequent frame,
cause the symbol detector to analyze the signal to detect a further symbol,
determine, based on an indication of a further detected symbol from the symbol detector, an estimated beginning of a further subsequent frame at a second time corresponding to at least one frame length after the further detected symbol and
cause the frame start detector to analyze the signal corresponding to the estimated beginning of the further subsequent frame to determine if the estimated beginning of the further subsequent frame is an actual beginning of the further subsequent frame.

12. An apparatus according to claim 11, wherein the controller is configured to select the detected symbol from a plurality of potential symbols detected by the symbol detector.

13. An apparatus according to claim 12, wherein the controller is configured to analyze the plurality of potential symbols to eliminate one or more symbols from the plurality of potential symbols.

14. An apparatus according to claim 13, wherein the frame comprises a downlink subframe and an uplink subframe;
wherein the controller is configured to eliminate a symbol when a length between the beginning of the symbol and a beginning of a previous symbol is not at least the sum of (i) a symbol interval and (ii) a minimum turnaround time between an end of the uplink subframe and a beginning of the downlink subframe.

15. An apparatus according to claim 12, wherein the controller is configured to:
group the plurality of potential symbols into at least a first group and a second group,
determine the estimated beginning of the subsequent frame to be approximately one frame period after the beginning of the detected symbol when the detected symbol is from the first group, and
determine the estimated beginning of the subsequent frame to be approximately two frame periods after the beginning of the detected symbol when the detected symbol is from the second group.

16. An apparatus according to claim 11, wherein the symbol detector includes:
an autocorrelation calculator; and at least one of:
a quadrature amplitude modulation (QAM) quantizer having an output coupled to an input of the autocorrelation calculator; and
a normalizer having an output coupled to the input of the autocorrelation calculator.

17. An apparatus according to claim 11, further comprising an automatic gain control (AGC) block;
wherein the controller is configured to
cause the AGC block to operate in a varying gain mode while the symbol detector analyzes the signal to detect the detected symbol,
cause the AGC block to operate in a fixed gain mode for a period corresponding to the estimated beginning of the subsequent frame.

18. An apparatus according to claim 17, wherein the controller is configured to cause the AGC block to operate in the varying gain mode while the detector analyzes the signal to detect the further detected symbol when the estimated beginning of the subsequent frame is not the actual beginning of the subsequent frame.

19. An apparatus according to claim 11, wherein the signal is an orthogonal frequency-division multiplexing (OFDM) signal.

20. An apparatus according to claim 18, further comprising a fast Fourier transform (FFT) calculator configured to process the signal; and
wherein the controller is configured to cause the frame start detector to analyze the signal corresponding to the estimated beginning of the subsequent frame, after the signal is processed by the FFT calculator, to determine if the estimated beginning of the subsequent frame is an actual beginning of the subsequent frame.

* * * * *